United States Patent
Pangrace

(10) Patent No.: US 11,082,586 B2
(45) Date of Patent: Aug. 3, 2021

(54) WOOD GRAIN COLOR REPRODUCTION METHOD

(71) Applicant: John Fred Pangrace, Rocky River, OH (US)

(72) Inventor: John Fred Pangrace, Rocky River, OH (US)

( * ) Notice: Subject to any disclaimer, the term of this patent is extended or adjusted under 35 U.S.C. 154(b) by 0 days.

(21) Appl. No.: 16/797,883

(22) Filed: Feb. 21, 2020

(65) Prior Publication Data
US 2020/0274993 A1    Aug. 27, 2020

Related U.S. Application Data

(60) Provisional application No. 62/809,465, filed on Feb. 22, 2019.

(51) Int. Cl.
| | |
|---|---|
| *G03G 15/01* | (2006.01) |
| *H04N 1/60* | (2006.01) |
| *B44F 9/02* | (2006.01) |
| *B41M 3/00* | (2006.01) |
| *B41M 1/18* | (2006.01) |
| *B41M 5/52* | (2006.01) |

(52) U.S. Cl.
CPC ............ *H04N 1/6066* (2013.01); *B41M 1/18* (2013.01); *B41M 3/008* (2013.01); *B41M 5/52* (2013.01); *B44F 9/02* (2013.01); *G03G 15/01* (2013.01)

(58) Field of Classification Search
None
See application file for complete search history.

(56) References Cited

U.S. PATENT DOCUMENTS

| | | |
|---|---|---|
| 6,121,382 A | 9/2000 | Chang et al. |
| 6,280,820 B1 | 8/2001 | Martino |
| 10,304,125 B1 | 5/2019 | Huisenga et al. |
| 2002/0167681 A1* | 11/2002 | Ide ..................... G03G 15/6585 358/1.9 |
| 2004/0045931 A1 | 3/2004 | Hill et al. |
| 2004/0256754 A1* | 12/2004 | Koguchi .............. G03G 15/224 264/40.1 |
| 2005/0074583 A1* | 4/2005 | Gratopp .................... B44C 3/02 428/174 |
| 2006/0187505 A1* | 8/2006 | Ng ......................... H04N 1/603 358/518 |
| 2007/0046963 A1* | 3/2007 | Nagase ................ G03G 9/0804 358/1.9 |

(Continued)

*Primary Examiner* — Patrick F Valdez
(74) *Attorney, Agent, or Firm* — Wentsler LLC

(57) ABSTRACT

A method of manufacturing a wood stain display sample includes optically scanning a wood sample including a wood stain with a computing device to generate a digital image of the wood stain. The method includes altering the digital image by adjusting a color of one or more portions of the digital image to correlate the color of the one or more portions to a color gamut of a xerographic printing process to form a color-adjusted digital image. The method includes printing the color-adjusted digital image to a substrate using a xerographic printing process to form the wood stain display sample. The printing includes printing an underlay toner to the substrate. The underlay toner includes a white or a transparent color. The printing includes printing a yellow, magenta, cyan, and black toner over the underlay toner. The printing includes printing an overlay toner to the black toner.

15 Claims, 5 Drawing Sheets

(56) References Cited

U.S. PATENT DOCUMENTS

| | | | |
|---|---|---|---|
| 2008/0159786 A1* | 7/2008 | Tombs | G03G 15/321 |
| | | | 399/222 |
| 2010/0015421 A1 | 1/2010 | Tyagi et al. | |
| 2011/0211856 A1 | 9/2011 | Bettiol | |
| 2013/0157826 A1 | 6/2013 | Preckel et al. | |
| 2014/0370252 A1 | 12/2014 | Regnier | |
| 2015/0268589 A1 | 9/2015 | Nedelin et al. | |

* cited by examiner

WOOD GRAIN COLOR REPRODUCTION METHOD

CROSS-REFERENCE TO RELATED APPLICATIONS

This application claims priority to and the benefit of U.S. Provisional Patent Application No. 62/809,465 that was filed on Feb. 22, 2019 and titled "WOOD GRAIN COLOR REPRODUCTION METHOD," the entire disclosure of which is herein incorporated by reference.

BACKGROUND

It is known to produce color samples of wood-stains as part of a chipping process. However, producing wood-stain samples via the chipping process can be slow, costly, and lacking in quality. It would be beneficial to provide a method for generating a wood grain sample that is more authentic.

SUMMARY

According to an aspect, a method of manufacturing a wood stain display sample is provided. The method comprises optically scanning a wood sample comprising a wood stain with a computing device to generate a digital image of the wood stain. The method comprises altering the digital image by adjusting a color of one or more portions of the digital image to correlate the color of the one or more portions to a color gamut of a xerographic printing process to form a color-adjusted digital image. The method comprises printing the color-adjusted digital image to a substrate using a xerographic printing process to form the wood stain display sample. The printing comprises printing an underlay toner to the substrate. The underlay toner comprises a white or a transparent color. The printing comprises printing a yellow, magenta, cyan, and black toner over the underlay toner. The printing comprises printing an overlay toner to the black toner, the overlay toner comprising a transparent color.

According to an aspect, a method of manufacturing a wood stain display sample is provided. The method comprises optically scanning a wood sample comprising a wood stain with a computing device to generate a digital image of the wood stain. The method comprises adjusting a color of the digital image to form a color-adjusted digital image. The method comprises printing the color-adjusted digital image to a substrate using a xerographic printing process to form the wood stain display sample. The printing comprises printing an underlay toner to the substrate to form an underlay layer. The underlay toner comprises a white or a transparent color. The underlay layer is formed in an interrupted manner and comprises a first underlay peak portion comprising a first underlay maximum thickness and a first underlay valley portion comprising a first underlay minimum thickness. The printing comprises printing a yellow, magenta, cyan, and black toner over the underlay toner. The yellow, magenta, cyan, and black toner are positioned over the first underlay peak portion and within the first underlay valley portion. The yellow, magenta, cyan, and black toner comprise a first surface that is in contact with the underlay toner and a second surface, opposite the first surface, that is non-planar. The printing comprises printing an overlay toner over the black toner to form an overlay layer in contact with the second surface. The overlay toner comprises a transparent color. The overlay layer is formed in an interrupted manner and comprises a first overlay peak portion comprising a first overlay maximum thickness and a first overlay valley portion comprising a first overlay minimum thickness. The first overlay peak portion is positioned over the first underlay peak portion and the first overlay valley portion is positioned over the first underlay valley portion.

According to an aspect, a wood stain display sample comprises a substrate. The wood stain display sample comprises an underlay toner positioned over the substrate. The underlay toner comprises a first underlay peak portion comprising a first underlay maximum thickness and a first underlay valley portion comprising a first underlay minimum thickness. The wood stain display sample comprises a yellow, magenta, cyan, and black toner positioned over the underlay toner. The yellow, magenta, cyan, and black toner is positioned over the first underlay peak portion and within the first underlay valley portion. The yellow, magenta, cyan, and black toner comprise a first surface that is in contact with the underlay toner and a second surface, opposite the first surface, that is non-planar. An overlay toner is positioned over the black toner to form an overlay layer in contact with the second surface. The overlay toner comprises a transparent color. The overlay layer comprises a first overlay peak portion comprising a first overlay maximum thickness and a first overlay valley portion comprising a first overlay minimum thickness. The first overlay peak portion is positioned over the first underlay peak portion and the first overlay valley portion is positioned over the first underlay valley portion such that the overlay toner is non-planar.

DESCRIPTION

Figure 1:
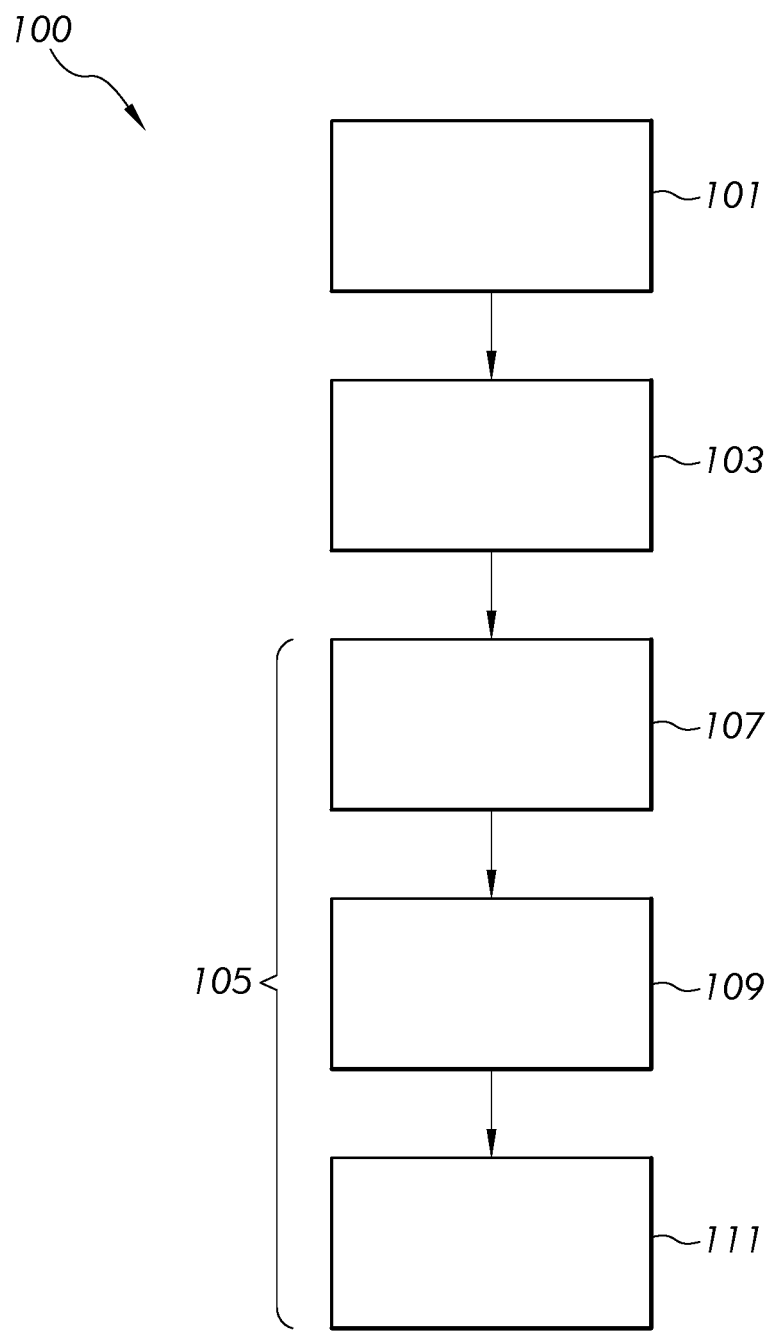
FIG. 1 illustrates a method of manufacturing a wood stain display sample.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

The present disclosure relates to the replacement of the wood stain chipping process with new print technologies. The present disclosure allows for the manufacture of wood stain marketing materials, such as a wood stain fan deck, color card, swatch, or the like. In particular, as a result of the present disclosure, the appearance of clear, semi-transparent (e.g., semi-solid), and/or solid wood stains on multiple kinds of wood surfaces can be obtained. In general, the method can comprise initially scanning a wood sample to an image file. Next, the image of the wood sample can be color corrected, for example, by a technician using an image editing software product. The color correction can be carried out to substantially match an actual wood sample within the color gamut of the xerographic printing process. The image file can then be modified with the appropriate layers for the textures. Finally, the image file can be printed in one step using a xerographic printer, which allows for a custom toner underprint and overprint of standard CMYK color toners (e.g., a Xerox Iridesse printer).

Referring to FIG. 1, a method 100 of manufacturing a wood stain display sample (e.g., wood stain display sample 601 illustrated in FIG. 5) is illustrated. For example, the method 100 can comprise one or more steps for manufacturing the wood stain display sample, wherein the one or more steps are illustrated schematically in FIG. 1. In some embodiments, the method 100 can comprise, at 101, optically scanning a wood sample comprising a wood stain with a computing device to generate a digital image of the wood stain. For example, the wood sample comprising the wood stain can comprise a piece of wood, such as a porous and fibrous structural and organic material that is found in the stems and roots of trees and other woody plants. The wood sample can comprise the wood stain, which is a longitudinal arrangement of wood fibers. The wood stain can comprise alternating regions of relatively darker and lighter wood that may result from differing growth parameters associated with different seasons. In some embodiments, different types of wood samples (e.g., pine, oak, cedar, cherry, etc.) can comprise differing wood stains, for example, with different colors (e.g., lighter or darker brown, etc.), different grain patterns, different surface textures, etc. By optically scanning the wood sample at 101, the method 100 can produce the wood stain display sample 601 that can mimic and/or replicate the wood stain of the wood sample.

Referring still to 101, a computing device can optically scan the wood sample comprising the wood stain. For example, the computing device can comprise an image scanner that can optically scan an image, for example, the wood sample, and generate a digital image of the wood stain. In some embodiments, the image scanner can comprise a charge-coupled device, a contact image sensor, or other types of image scanners that can optically scan images and generate digital images. In some embodiments, the wood sample can be optically scanned and created with a high-end flatbed scanner, for example, a Heidelberg Linotype-Hell Topaz Color Scanner. The image resolution can, in some embodiments, be 600 dots per inch (DPI) at an actual size of the wood stain display sample and at least two (2) inches square (e.g., about 51 millimeters). In some embodiments, the digital image can comprise a format comprising CMYK eight-bit photoshop (e.g., .psd).

At 103, the method 100 can comprise altering the digital image by adjusting a color of one or more portions of the digital image to correlate the color of the one or more portions to a color gamut of a xerographic printing process to form a color-adjusted digital image. For example, as will be described relative to 105, 107, 109, 111, and FIGS. 2-6, the wood stain display sample 601 can be produced by a xerographic printing process on a substrate. After the computing device has optically scanned the wood sample and the digital image of the wood stain has been generated, the digital image can be altered. For example, in some embodiments, one or more portions of the digital image may correlate to a color gamut that is producible by the xerographic printing process on a substrate. For example, the color gamut can comprise a complete subset of colors which can be accurately represented in a certain circumstance (e.g., via the xerographic printing process on a substrate). In some embodiments, the one or more portions of the digital image may correlate with the color gamut of the xerographic printing process, such that these portions may not need to be altered. However, in some embodiments, one or more portions of the digital image may not correlate with the color gamut of the xerographic printing process, such that these portions may be altered (e.g., color adjusted). For example, these portions may be adjusted in color to correlate with the color gamut, such that these portions may be printed by the xerographic printing process. In some embodiments, the digital image may be altered (e.g., to correlate to the color gamut) and, the altered digital image may comprise the color-adjusted digital image.

In some embodiments, following the optical scanning (e.g., at 101) and the altering of the digital image by color adjustment (e.g., at 103), the method 100 can comprise, at 105, printing the color-adjusted digital image to a substrate using a xerographic printing process to form the wood stain display sample. For example, the printing 105 can comprise one or more steps, such as printing an underlay toner to the substrate (e.g., at 107), then printing a yellow, magenta, cyan, and black toner over the underlay toner (e.g., at 109), and then printing an overlay toner to the black toner (e.g., at 111). The printing an underlay toner to the substrate (e.g., at 107) is illustrated and described relative to FIG. 2. The printing a yellow, magenta, cyan, and black toner over the underlay toner (e.g., at 109) is illustrated and described relative to FIGS. 3-4. The printing the overlay toner to the black toner (e.g., at 111) is illustrated and described relative to FIG. 5.

In some embodiments, the printing process 105 can comprise a xerographic digital printing press, for example, an Iridesse xerographic digital printing press. In some embodiments, the xerographic digital printing press can print standard process colors (e.g., CMYK) in addition to white and/or clear toners (e.g., underlay toner as described below). The printing sequence can be carried out as follows. First, a substrate 203 may be provided, which may comprise a white-colored material. Then, utilizing the specific technology of the digital printer to compose an underlay and overlay color toner with the traditional cyan, magenta, yellow, and black toners, the color layers can be generated in the order of white, yellow, magenta, cyan, black and clear. The purpose of the white and clear toner is to create and improve the texture of the wood grain image. In some embodiments, the underlay layer (e.g., the white toner) that is applied to the substrate 203 is not limited to the white color, but, rather, may comprise a clear. The top (e.g., overlay) layer (e.g., the clear toner that is applied to the black toner) may be limited to clear so as not to affect the color of the scanned wood sample.

Referring to FIGS. 2-6, it will be appreciated that while the printing 105 is illustrated and described as consecutive steps (e.g., 107, 109, 111), the steps (e.g., 107, 109, 111) of the printing 105 may be performed at one time by being applied together to the substrate. For example, as part of the xerographic process, all of the toners (e.g., the underlay toner, the yellow, magenta, cyan, and black, and the overlay toner) may be applied individually to a transfer belt. The toners may be applied individually to the transfer belt in reverse order of their application to the substrate. For example, the overlay toner may be applied to the transfer belt first. Next, the black, cyan, magenta, and yellow toners may be applied to the overlay toner. Finally, the underlay toner may be applied to the cyan toner. Following this application, all of the toners can be transferred at one time to the substrate. Once the toners are transferred to the substrate, they may be fused and/or melted to the substrate, for example, by a fuser roller. In this way, the toners may not be individually applied, transferred, and fused to the substrate, but, rather, applied, transferred, and fused simultaneously. However, for the purposes of illustration and to more clearly illustrate how the portions are positioned relative to one another and to the substrate, the simultaneous application of the toners to the substrate may be illustrated and described relative to FIGS. 2 to 6 in multiple steps.

Figure 2:
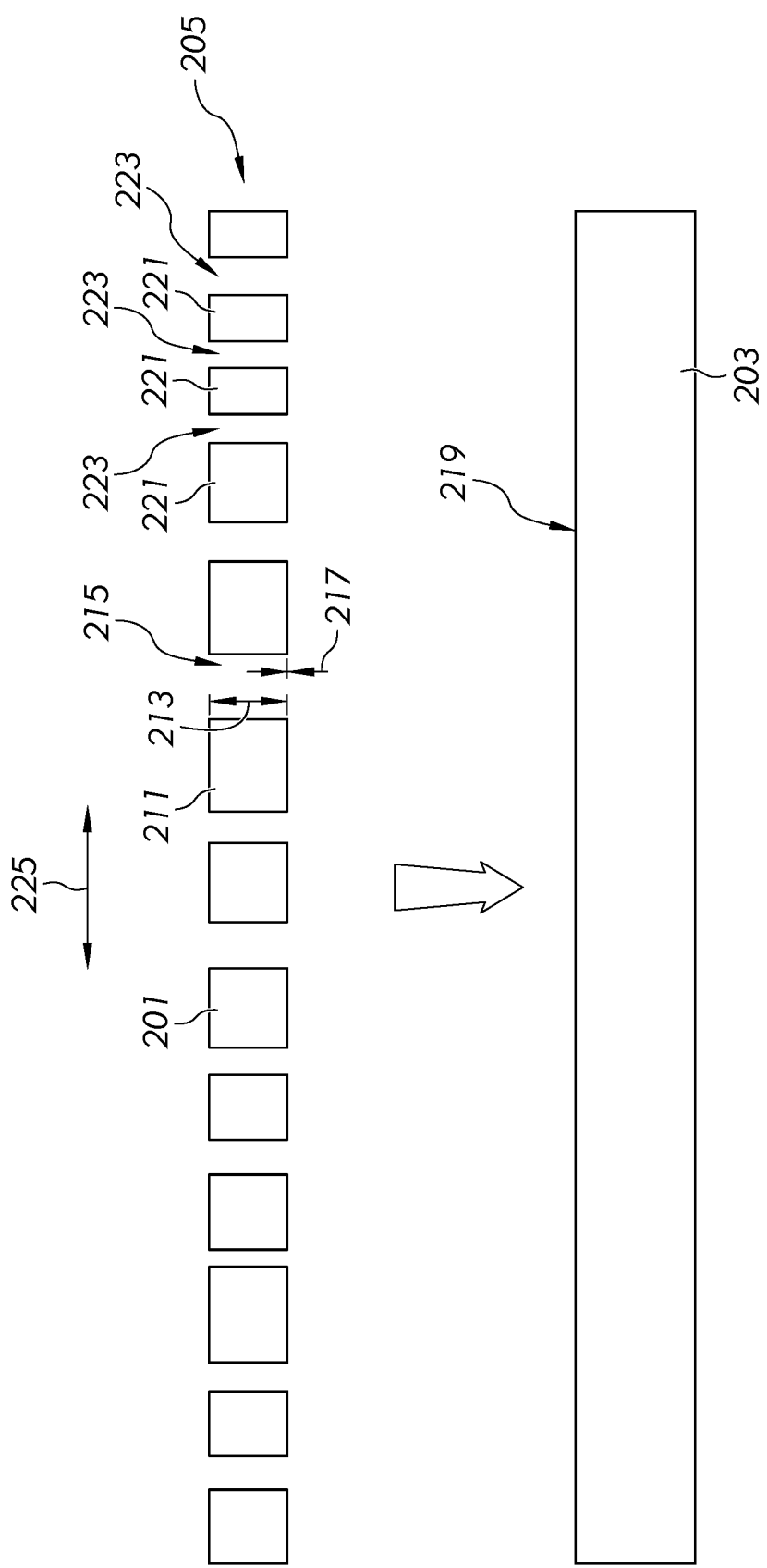
FIG. 2 illustrates an underlay toner being applied to a substrate.

Referring to FIG. 2, as part of the printing 107 (e.g., illustrated in FIG. 1), methods 100 can comprise printing an underlay toner 201 to a substrate 203, wherein the underlay toner 201 can comprise a white or a transparent color. For example, the substrate 203 can initially be provided. In some embodiments, the substrate 203 can comprise a print substrate that can comprise a relatively high-quality production print paper, such as 216 grams per square meter (e.g., gsm) or 271 gsm gloss or silk cover. The substrate 203 can comprise a paper material, a synthetic (e.g., plastic) paper material, etc. In some embodiments, the substrate 203 can comprise a white color. For example, due to the white color of the substrate, the wood sample comprising the wood stain can be reproduced by a CMYK color reproduction process in which a white substrate can produce good results.

In some embodiments, the wood stain can comprise a texture that may be replicable by the xerographic printing process to form the wood stain display sample 601 comprising a similar texture. For example, as used herein, the texture may comprise a non-planar, three-dimensional surface that may, to a user, feel rough with one or more raised portions and one or more indentations. In some embodiments, the texture of the wood stain display sample 601 can mimic the texture of the wood sample comprising the wood stain, such that when a user touches the wood stain display sample 601, the user may experience a tactile sensation of grooves, bumps, smooth portions, rough portions, etc. To obtain the texture, the printing the underlay toner 201 to the substrate 203 (e.g., at 107) can comprise forming an underlay layer 205. In some embodiments, the underlay layer 205 can be formed in an interrupted manner that comprises a first underlay peak portion 211 comprising a first underlay maximum thickness 213 and a first underlay valley portion 215 comprising a first underlay minimum thickness 217. For example, by forming the underlay layer 205 in an interrupted manner, the underlay layer 205 may comprise a non-constant thickness, wherein the thickness may be measured along a direction that is substantially perpendicular to a surface 219 of the substrate 203 that the underlay layer 205 is positioned over and in contact with. For example, the underlay layer 205, formed in the interrupted manner, can comprise one or more gaps, openings, spaces, etc. (e.g., wherein the gaps, openings, spaces, etc. are located at the underlay valley portions 215) across the underlay layer 205. In some embodiments, the surface 219 of the substrate 203 can be substantially planar and flat.

It will be appreciated that while the underlay layer 205 is described as comprising the first underlay peak portion 211 and the first underlay valley portion 215, the underlay layer 205 can comprise a plurality of first underlay peak portions 221 (e.g., wherein each of the first underlay peak portions 221 may be substantially similar to the first underlay valley portion 215) and a plurality of first underlay valley portions 223 (e.g., wherein each of the first underlay valley portions 223 may be substantially similar to the first underlay valley portion 215). For example, in some embodiments, the first underlay peak portions 221 may alternate with the first underlay valley portions 223, such that one of the first underlay peak portions 221 (e.g., such as the first underlay peak portion 211) may be positioned between two of the first underlay valley portions 223 (e.g., such as the first underlay valley portion 215). Likewise, in some embodiments, the first underlay valley portions 223 may alternate with the first underlay peak portions 221, such that one of the first underlay valley portions 223 (e.g., such as the first underlay valley portion 215) may be positioned between two of the first underlay peak portions 221 (e.g., such as the first underlay peak portion 211). For example, along a width direction 225 of the substrate (e.g., wherein the width direction 225 is substantially parallel to the surface 219 of the substrate 203 that the underlay layer 205 is in contact with, the underlay layer 205 can comprise alternating underlay peak portions and underlay valley portions.

In some embodiments, the first underlay peak portion 211 can comprise the first underlay maximum thickness 213 that may be greater than the first underlay minimum thickness 217 of the first underlay valley portion 215. For example, the first underlay valley portion 215 (e.g., and the first underlay valley portions 223) may comprise openings (e.g., gaps, spaces, voids, etc.) that may be devoid of material. In this way, the first underlay valley portion 215 (e.g., and the first underlay valley portions 223) may comprise a thickness of zero (e.g., due to being devoid of material) such that the first underlay minimum thickness 217 may be zero. As such, openings (e.g., gaps, spaces, voids, etc.) may be present between the first underlay peak portion 211 (e.g., between adjacent first underlay peak portions 221). In some embodiments, the first underlay maximum thickness 213 may be non-zero, due to the first underlay peak portion 211 (e.g., and the first underlay peak portions 221) comprising a thickness or height. In some embodiments, the width (e.g., as measured along the width direction 225) of the first underlay peak portion 211 (e.g., and the first underlay peak portions 221) may be non-constant, such that some of the first underlay peak portions 221 may comprise differing widths than other first underlay peak portions 221. Similarly, in some embodiments, the width (e.g., as measured along the width direction 225) of the first underlay valley portion 215 (e.g., and the first underlay valley portions 223) may be non-constant, such that some of the first underlay valley portions 223 may comprise differing widths than other first underlay valley portions 223.

Figure 3:
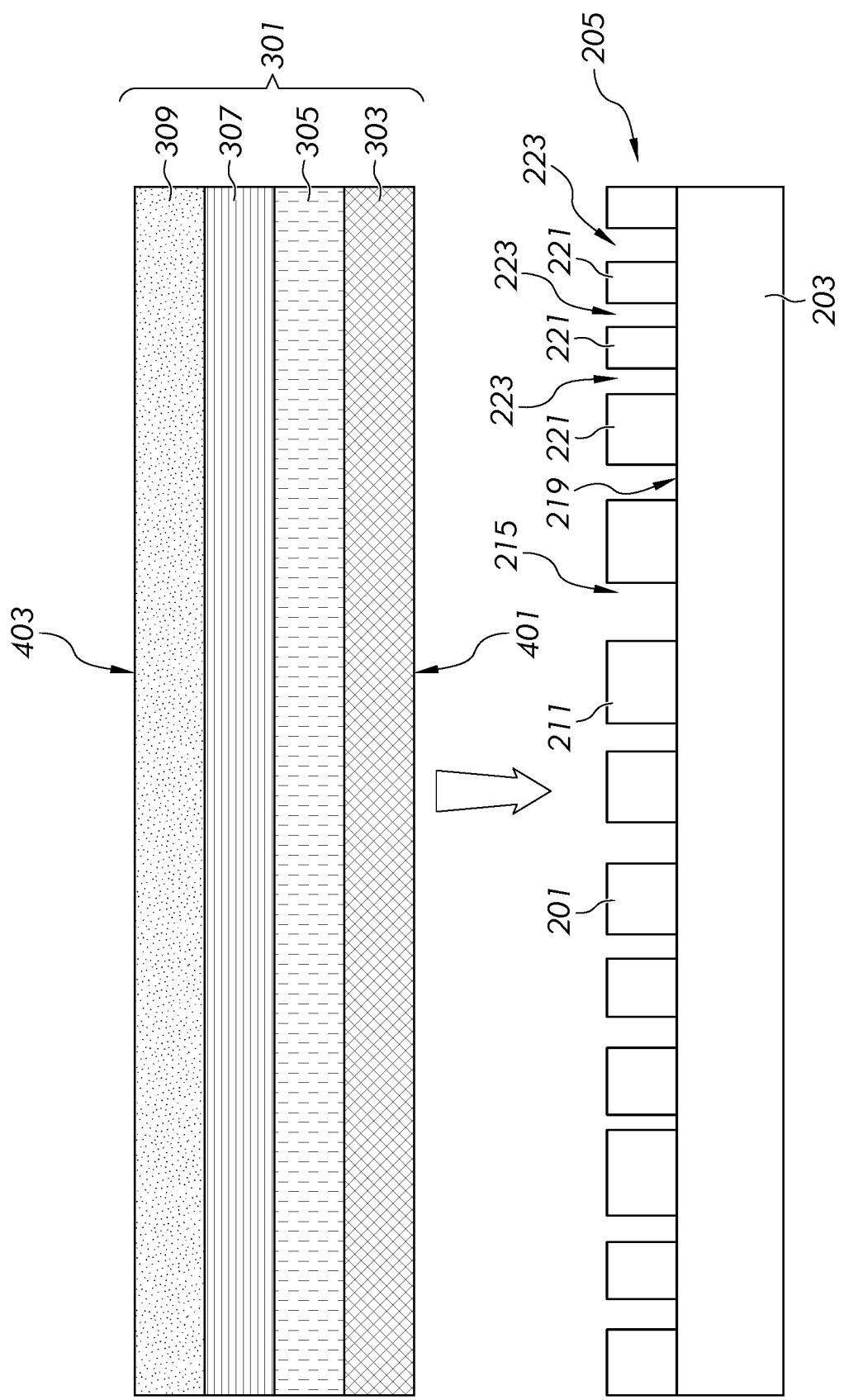
FIG. 3 illustrates a yellow, magenta, cyan, and black toner being applied to the underlay toner.

Referring to FIG. 3, as part of the printing 109 (e.g., illustrated in FIG. 1), methods 100 can comprise printing a yellow, magenta, cyan, and black toner (e.g., CMYK toner 301) over the underlay toner 201, wherein the yellow, magenta, cyan, and black toner (e.g., CMYK toner 301) may be positioned over the first underlay peak portion 211 and within the first underlay valley portion 215. The yellow, magenta, cyan, and black toner (e.g., CMYK toner 301) can comprise individual toners, for example, a yellow toner 303, a magenta toner 305, a cyan toner 307, and a black toner 309. The yellow toner 303, the magenta toner 305, the cyan toner 307, and the black toner 309 can be placed in a number of different orders and are not limited to the illustrated order of FIG. 3. However, in some embodiments, in order of closest to the substrate 203 to furthest from the substrate 203, the yellow toner 303 can be placed first (e.g., in contact with the underlay toner 201), followed by the magenta toner 305 being in contact with the yellow toner 303, followed by the cyan toner 307 being in contact with the magenta toner 305, followed by the black toner 309 being in contact with the cyan toner 307.

Figure 4:
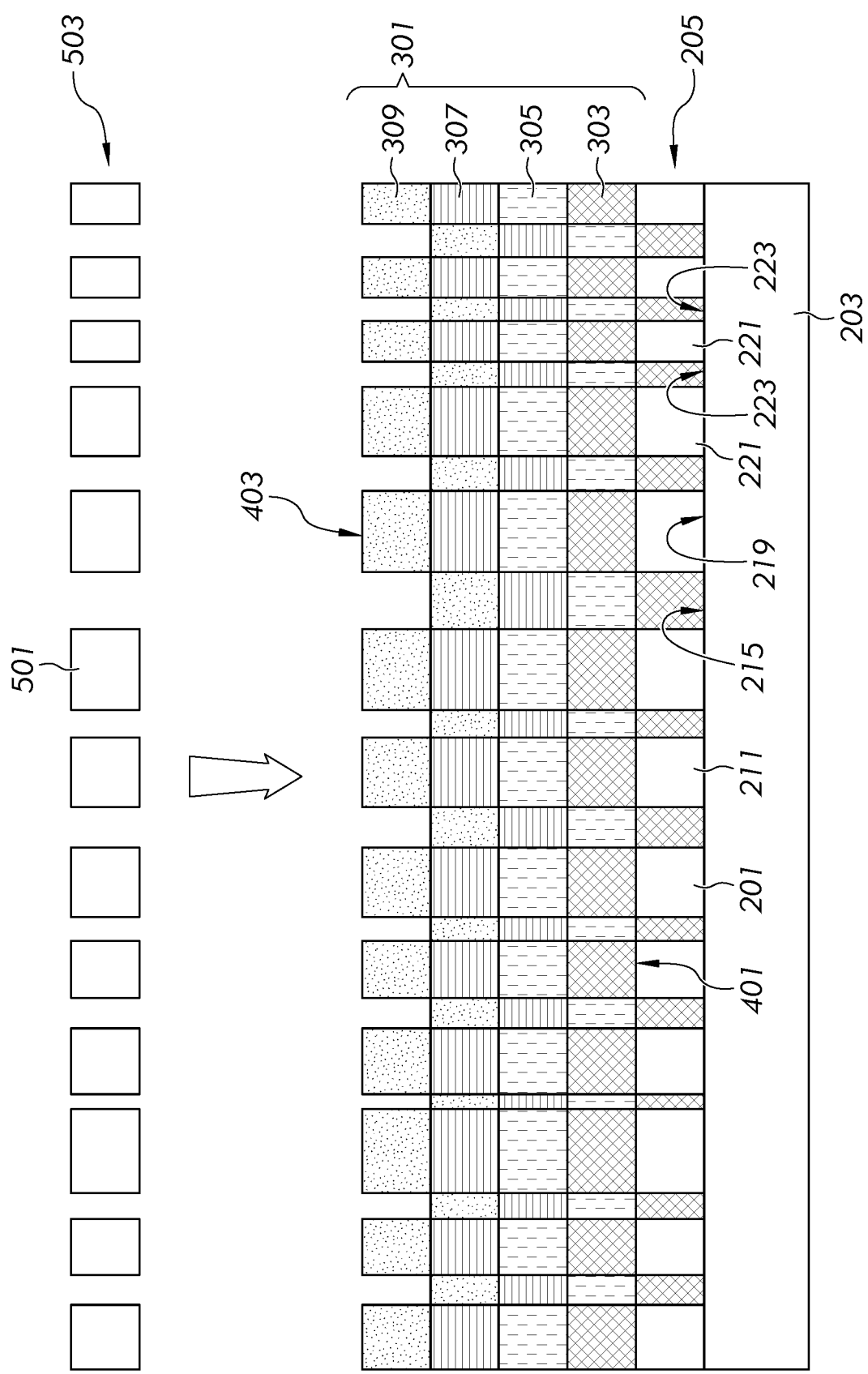
FIG. 4 illustrates an overlay toner being applied to the black toner.

While FIG. 3 illustrates the yellow, magenta, cyan, and black toner (e.g., CMYK toner 301) being applied to the underlay toner 201, FIG. 4 illustrates the yellow, magenta, cyan, and black toner (e.g., CMYK toner 301) following the application of the yellow, magenta, cyan, and black toner (e.g., CMYK toner 301) to the underlay toner 201. For example, in some embodiments, the yellow, magenta, cyan, and black toner (e.g., CMYK toner 301) can comprise a first surface 401 that may be in contact with the underlay toner 201 and a second surface 403, opposite the first surface 401, that is non-planar. For example, the first surface 401 and the second surface 403 are illustrated in FIGS. 3-4, wherein in FIG. 3, the first surface 401 and the second surface 403 may initially be substantially planar and/or unbroken. However, following the application of the yellow, magenta, cyan, and black toner (e.g., CMYK toner 301) to the underlay toner 201, the first surface 401 and the second surface 403 may be non-planar. Likewise, the yellow toner 303, the magenta toner 305, the cyan toner 307, and the black toner 309 may each be non-planar as well. For example, the first surface 401 (e.g., which may define a bottom surface of the yellow, magenta, cyan, and black toner 301) can contact a top surface of the underlay toner 201 (e.g., a top surface of the first underlay peak portion 211, 221) and the surface 219 of the substrate 203. In particular, due to the underlay toner 201 comprising openings (e.g., the first underlay valley portion 215, 223), the yellow toner 303 can rest upon (e.g., or be positioned over) the first underlay peak portions 211, 221 of the underlay toner 201 while also being received within the first underlay valley portions 215, 223. As such, the first surface 401, and, thus, the yellow toner 303, the magenta toner 305, the cyan toner 307, and the black toner 309, can be non-planar. Likewise, the second surface 403, which may be opposite the first surface 401 and may face a direction opposite the substrate 203, can be non-planar.

Figure 5:
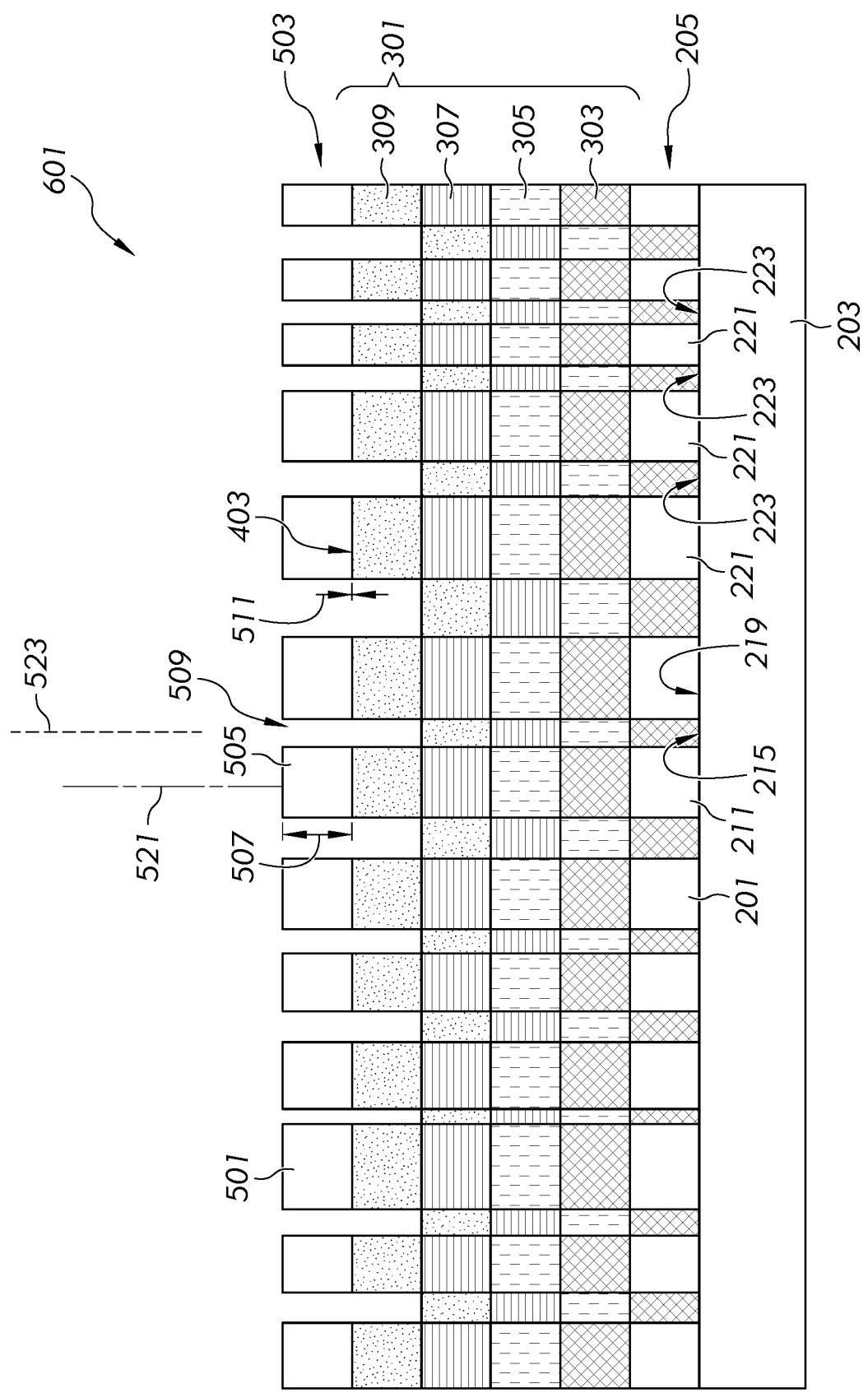
FIG. 5 illustrates the overlay toner in contact with the black toner.

Referring to FIGS. 4 and 5, as part of the printing 111, methods 100 can comprise printing an overlay toner 501 over the black toner 309 to form an overlay layer 503 in contact with the second surface 403. In some embodiments, the overlay toner 501 can comprise a transparent color. The overlay layer 503 can be formed in an interrupted manner and may comprise a first overlay peak portion 505 comprising a first overlay maximum thickness 507 and a first overlay valley portion 509 comprising a first overlay minimum thickness 511. For example, to obtain the texture, the overlay layer 503 can be printed in the interrupted manner that comprises the overlay peak portions and the overlay valley portions. The formation of the overlay layer 503 in the interrupted manner can cause the overlay layer 503 to comprise a non-constant thickness, wherein the thickness may be measured along a direction that is substantially perpendicular to the surface 219 of the substrate 203. For example, the overlay layer 503, formed in the interrupted manner, can comprise one or more gaps, openings, spaces, etc. (e.g., wherein the gaps, openings, spaces, etc. are located at the overlay valley portions 509) across the overlay layer 503.

The first overlay peak portion 505 can be positioned over the first underlay peak portion 211 and the first overlay valley portion 509 can be positioned over the first underlay valley portion 215. For example, by being positioned over, the overlay peak portions (e.g., 505) can be located over the underlay peak portions (e.g., 211, 221) such that an axis 521 that is perpendicular to the surface 219 can intersect both the first underlay peak portion 211 and the first overlay peak portion 505. Likewise, in some embodiments, by being positioned over, the overlay valley portions (e.g., 509) can be located over the underlay valley portions (e.g., 215, 223) such that a second axis 523 that is perpendicular to the surface 219 can intersect both the first overlay valley portion 509 and the first underlay valley portion 215. Indeed, the locations of the overlay peak portions can match the locations of the underlay peak portions, such that all of the overlay peak portions can be positioned over the underlay peak portions. Likewise, the locations of the overlay valley portions can match the locations of the underlay valley portions, such that all of the overlay valley portions can be positioned over the underlay valley portions. In this way, a textured, non-planar surface of the overlay toner 501 can be formed with a difference between the peaks and valleys comprising a sum of the first overlay maximum thickness 507 and the first underlay maximum thickness 213. Likewise, in some embodiments, the first underlay minimum thickness 217 and the first overlay minimum thickness 511 may each be zero, due to the first overlay valley portions (e.g., 509) defining openings that are devoid of the overlay toner 501 and the underlay valley portions (e.g., 215, 223) defining openings that are devoid of the underlay toner 201.

As described herein, in some embodiments, wood stain marketing literature can be created utilizing the custom wood-grain images described above. A professional graphic arts native file can be generated by a program such as Adobe Indesign, Adobe Illustrator, Quark Express, etc. In some embodiments, this file can graphically define the final printed piece. These software programs can generate a print file that can be processed on the xerographic digital printer's front end, separating the white and clear channels as unique spot colors and be used to print these wood stain marketing literature materials. In some embodiments, following the formation of the digital image of the wood stain display sample, methods can comprise altering the digital image by adjusting a color of one or more portions of the digital image to correlate the color of the one or more portions to a color gamut of a xerographic printing process to form a color-adjusted digital image. For example, the altering the digital image can comprise adjusting the color of one or more portions of the digital image. In some embodiments, the digital images can be adjusted (e.g., color corrected) by an operator or technician to match the scanned digital image of the wood stain display sample utilizing the color gamut of the xerographic printing process. In some embodiments, some portions (e.g., less than all) of the digital image of the wood stain display sample may be adjusted to match the color gamut of the xerographic printing process. In some embodiments, all (e.g., all portions) of the digital image of the wood stain display sample may be adjusted to match the color gamut of the xerographic printing process.

In some embodiments, one or more additional color channels (e.g., plates, spot colors, etc.) can be added to the color-adjusted digital image (e.g., of the wood stain display sample). For example, in some embodiments, two additional color channels can be added, wherein the two new channels may be substantially identical in content. One of the color channels can print white (e.g., the white underlay toner that may initially be applied to the substrate). The other of the color channels can print clear (e.g., the clear overlay layer that can be applied last and can comprise an overlay toner over the black toner of the CYMK toners. In these embodiments, the first color channel (e.g., the white toner) can print first such that the white toner can underlay the CMYK and the second color channel (e.g., the clear layer) can print last such that the clear layer can overlay the CMYK when printing. In some embodiments, the content of the two additional channels can be created (e.g., subjectively created) by the operators or technicians to allow the white and clear xerographic toner build-up to create a unique texture and dimension to the final digitally printed wood grain image. In some embodiments, for maximum effect, the two additional layers can be identical in content.

In operation, an artist may first create a print project utilizing one of the above listed graphic layout software programs. A proxy image can be placed wherever a wood-grain image (e.g., chip) sample needs to be positioned. Once the layout is created and approved, the native document, along with all of the connected graphics and fonts, is forwarded to the digital chip print service pre-print department. The document can be verified and pre-flighted. The proxies' links may then be swapped out for the final archived digital wood grain images. Final print files specific for the xerographic printing process (e.g., Xerox Iridesse) may be created and sent to the printer. The wood-grain images (e.g., chips) may then be printed in the WCMYKC process (e.g., described above) along with any or all other color type and graphics.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular, regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of manufacturing a wood stain display sample, the method comprising:
    optically scanning a wood sample comprising a wood stain with a computing device to generate a digital image of the wood stain;
    altering the digital image by adjusting a color of one or more portions of the digital image to correlate the color of the one or more portions to a color gamut of a xerographic printing process to form a color-adjusted digital image;
    printing the color-adjusted digital image to a substrate using a xerographic printing process to form the wood stain display sample, the printing comprising:
        printing an underlay toner to the substrate to form an underlay layer that comprises one or more gaps, the underlay toner comprising a white or a transparent color;
        printing a yellow, magenta, cyan, and black toner over the underlay toner; and
        printing an overlay toner to the black toner, the overlay toner comprising a transparent color.

2. The method of claim 1, wherein the underlay layer is non-planar.

3. The method of claim 1, wherein the printing the overlay toner to the black toner comprises printing the overlay toner to form an overlay layer that comprises one or more gaps.

4. The method of claim 3, wherein the overlay layer is non-planar.

5. The method of claim 1, wherein the substrate comprises a paper material.

6. The method of claim 1, wherein the printing the underlay toner comprises printing the underlay toner to a surface of the substrate, and wherein the surface is substantially planar.

7. A method of manufacturing a wood stain display sample, the method comprising:
    optically scanning a wood sample comprising a wood stain with a computing device to generate a digital image of the wood stain;
    adjusting a color of the digital image to form a color-adjusted digital image;
    printing the color-adjusted digital image to a substrate using a xerographic printing process to form the wood stain display sample, the printing comprising:
        printing an underlay toner to the substrate to form an underlay layer, the underlay toner comprising a white or a transparent color, the underlay layer formed in an interrupted manner and comprising a first underlay peak portion comprising a first underlay maximum thickness and a first underlay valley portion comprising a first underlay minimum thickness;
        printing a yellow, magenta, cyan, and black toner over the underlay toner, the yellow, magenta, cyan, and black toner positioned over the first underlay peak portion and within the first underlay valley portion, the yellow, magenta, cyan, and black toner comprising a first surface that is in contact with the underlay toner and a second surface, opposite the first surface, that is non-planar; and
        printing an overlay toner over the black toner to form an overlay layer in contact with the second surface, the overlay toner comprising a transparent color, the overlay layer formed in an interrupted manner and comprising a first overlay peak portion comprising a first overlay maximum thickness and a first overlay valley portion comprising a first overlay minimum thickness, the first overlay peak portion positioned over the first underlay peak portion and the first overlay valley portion positioned over the first underlay valley portion.

8. The method of claim 7, wherein the underlay layer is non-planar.

9. The method of claim 7, wherein the overlay layer is non-planar.

10. The method of claim 7, wherein the substrate comprises a paper material.

11. The method of claim 7, wherein the printing the underlay toner comprises printing the underlay toner to a surface of the substrate, and wherein the surface is substantially planar.

12. A wood stain display sample comprising:
    a substrate;
    an underlay toner positioned over the substrate, the underlay toner comprising a first underlay peak portion comprising a first underlay maximum thickness and a first underlay valley portion comprising a first underlay minimum thickness;
    a yellow, magenta, cyan, and black toner positioned over the underlay toner, the yellow, magenta, cyan, and black toner positioned over the first underlay peak portion and within the first underlay valley portion the yellow, magenta, cyan, and black toner comprising a first surface that is in contact with the underlay toner and a second surface, opposite the first surface, that is non-planar; and an overlay toner positioned over the black toner to form an overlay layer in contact with the second surface, the overlay toner comprising a transparent color, the overlay layer comprising a first overlay peak portion comprising a first overlay maximum thickness and a first overlay valley portion comprising a first overlay minimum thickness, the first overlay peak portion positioned over the first underlay peak portion and the first overlay valley portion positioned over the first underlay valley portion such that the overlay toner is non-planar.

13. The method of claim 12, wherein the underlay layer is non-planar.

14. The method of claim 12, wherein the overlay layer is non-planar.

15. The method of claim 12, wherein the underlay toner is in contact with a surface of the substrate, and wherein the surface is substantially planar.

* * * * *